Figure 1:
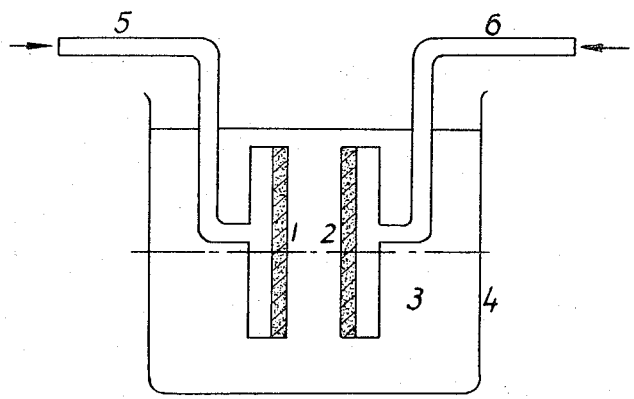

Feb. 28, 1967    R. DIEBERG    3,306,780
SINTERED NICKEL-CARBON GAS DIFFUSION ELECTRODE FOR FUEL CELLS
Filed Dec. 28, 1960

INVENTOR:
ROLF DIEBERG

By  Erich M. H. Radde

AGENT

United States Patent Office 3,306,780
Patented Feb. 28, 1967

3,306,780
SINTERED NICKEL-CARBON GAS DIFFUSION
ELECTRODE FOR FUEL CELLS
Rolf Dieberg, Dortmund-Aplerbeck, Germany, assignor to
Varta Aktiengesellschaft, Hagen, Westphalia, Germany,
a corporation of Germany
Filed Dec. 28, 1960, Ser. No. 78,993
Claims priority, application Germany, Dec. 31, 1959,
A 33,647
10 Claims. (Cl. 136—121)

The present invention relates to improvements in gas diffusion electrodes for fuel cells wherein electric current is generated directly by the combustion of gases.

The gas diffusion electrodes are essential structural elements of fuel cells because "cold combustion" is effected thereat. The combustible operating gas of such cells, for instance, hydrogen, is delivered to one of the electrodes where it is first absorbed and then displaced by the further delivery of gas to the electrode. As the gas leaves the absorptive layer of the electrode, it leaves one electron per atom behind so as to impart a negative charge to the electrode while a gas cation, for instance, a hydrogen ion, is diffused into the electrolyte. An oxidizing gas, for instance, oxygen, is delivered to the other or counter-electrode, the absorptive layer of which also first absorbs the gas and, after ionization, diffuses oxygen anions (O⁻) into the electrolyte while the removal of electrons from the electrode charges the same positively. In the electrolyte, the oxygen anions and hydrogen cations combine into water.

If maximum efficiency is to be obtained with such fuel cells, the gas diffusion electrodes must be capable of consuming a maximum amount of combustible and oxidizing gases. It is, therefore, of utmost importance to have effective catalysts in a suitable form built into said electrodes.

Gas diffusion electrodes with built-in catalysts are known. Sintered pure nickel electrodes have been used for this purpose, for instance. It has also been attempted to oxidize such pure nickel electrodes and to use such oxidized nickel electrodes in fuel cells. However, operating high pressures and temperatures are required to operate fuel cells with such electrodes.

Another conventional type of gas diffusion electrodes is the so-called double matrix electrode in which Raney catalyst is built into a porous sintered nickel matrix, a good electron conductivity being assured by filling the interspaces of such "hollow electrodes" with metallic grains. Raney-nickel catalyst is prepared by dissolving the aluminum out of Raney's alloy by a treatment with warm sodium hydroxide solution whereby the nickel remains in suspension in black, pyrophoric form.

It has also been proposed to make the combustible gas absorptive electrode of active carbon impregnated with 10% of silver and the oxidizing gas absorptive electrode of active carbon impregnated with nickel.

It is the primary object of the present invention to provide gas-tight gas diffusion electrodes for fuel cells wherein the electrochemical gas conversion is effected without high gas pressure and at or about room temperature with sufficient speed to convert the combustible gas economically into electric current.

The improved gas diffusion electrodes of this invention are distinguished from conventional electrodes of this type primarily in that they assure the combustion reaction in the cell to an heretofore unknown extent without the use of high gas pressures and at ambient temperatures.

The above and other objects and advantages are accomplished according to the invention by providing a gas diffusion electrode comprising essentially a porous sintered nickel matrix having carbon powder sintered into the matrix.

In accordance with one preferred embodiment, the amount by volume of the carbon is up to about 30% of the electrode mass and the carbon powder grains have a size of less than 60μ. It has been found that the electrochemical reaction proceeds particularly rapidly with such electrodes.

The accompanying drawing schematically illustrates two preferred embodiments of fuel cells with electrodes of the present invention. In the drawing, FIG. 1 shows one type of fuel cell, and
FIG. 2 shows a modified type of cell.

In FIG. 1, there is shown a container 4 holding the electrolyte 3 which may be a solution of potassium hydroxide of 1.3 density. The negative gas diffusion electrode is indicated at 1 and the positive electrode at 2, a combustible gas, for instance, hydrogen, being delivered to electrode 1 by conduit 5 while an oxidizing gas, for instance, oxygen, is delivered to electrode 2 by conduit 6. In the illustrated example, the pressure under which the gases are delivered to the electrodes may vary between about 0.25 atm. and 2 atm., atmospheric pressure being preferred. The temperature of the electrolyte in the illustrated example is 20° C. The optimum temperature has been found to be about 65° C. The current densities are about 100–150 ma./sq. cm.

Figure 2:
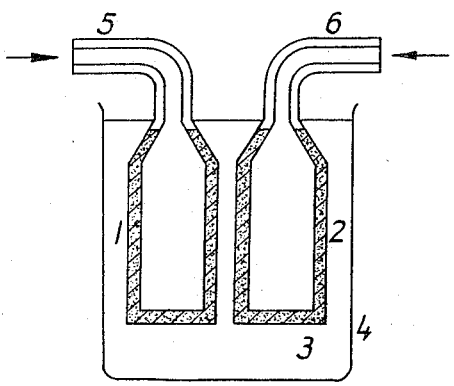

In the embodiment of FIG. 2, the electrodes 1' and 2' are tubular and the gases are supplied to the hollow interior space of the electrodes by conduits 5' and 6'. Otherwise, the cells of FIGS. 1 and 2 are identical.

The electrodes of the illustrated fuel cells have gas absorptive and diffusion elements of a porous sintered nickel matrix wherein carbon powder is sintered. In a preferred embodiment, the carbon grains serve as carriers for catalytic substances, especially noble metal catalysts.

Palladium and mixed catalysts of palladium and silver are particularly effective catalysts for the gas diffusion electrode for the combustible gas such as hydrogen. Catalyst mixtures of compounds of silver, vanadium, and molybdenum are also useful for this purpose.

The electrodes may take various forms, those shown in FIG. 1 being plates and those in FIG. 2 being of tubular structure. They may be manufactured in a variety of ways. For instance, a suitable mixture of nickel and carbon powder may be poured into a mold which has a central core of a graphite-coated ceramic mass and, after the powder has been well distributed in the mold by agitation, it is sintered. Another possibility is to permit the powder mass to shrink by sintering onto a tube provided with apertures for the delivery of gases. These are two ways of producing tubular electrode structures.

Electrode plates may be made by pressing the powder mixture in a press under a pressure of two tons or more per sq. cm. without decreasing the porosity of the active carbon. The pressure merely causes the nickel powder to become compressed, whereupon sintering is effected in a conventional manner.

If metallic catalysts are to be added to the gas diffusion electrodes, the sintered skeleton may first be produced in the indicated manner, for instance, from finely grained graphitized carbon particles and nickel powder, and the porous structure may be then impregnated with the desired catalyst or catalysts.

A preferred way of providing the sintered structure with a metal catalyst consists, for instance, in impregnating such sintered structures with solutions of metal salts and then treating the metal salt-impregnated electrodes with reducing solutions such as with hydrazine solutions so as to precipitate the catalyst metal on said electrodes. The metal catalyst may also be precipitated on the electrodes impregnated with metal salt solutions by a cathodic treatment.

An example of an electrode material according to this invention is a mixture of nickel carbonyl powder having an apparent density of 500 g./l. and up to about 30%, by volume, of a very fine graphite powder of a grain size of less than 60µ, preferably about 25µ. When sintered, this mixture will produce a matrix which has distributed throughout its structure extremely fine pores and channels.

Catalysts, such as palladium and platinum, are particularly effective in colloidal form and such colloidal catalysts may be readily prepared on microporous carbon.

The sintered carbon-nickel matrix has a considerably larger internal surface than pure nickel structures of the same type and gas diffusion electrodes of sintered carbon-nickel matrixes are, therefore, much more effective in fuel cells under relatively low operating pressures and temperatures than conventional electrodes. Comparative tests have shown that pure nickel electrodes carrying the same catalysts are not nearly as efficient as the carbon-nickel electrodes.

Furthermore, using active carbon with nickel produces considerable weight economies while in no way impairing the rigidity of the electrodes.

As indicated, the negative electrode may carry a catalyst of palladium and/or platinum, with silver, if desired. The positive electrode may contain a platinum-rhodium catalyst, preferably a platinum-rhodium alloy containing up to 10%, for instance 8% rhodium. It may also carry silver, molybdenum, and vanadium compounds.

Of course, many changes and variations in the preparation of the porous sintered nickel matrix having carbon powder sintered thereinto, in the catalysts employed, in the manner of incorporating the catalyst into the nickel-carbon electrode, and the like may be made by those skilled in the art in accordance with the principles set forth herein and in the claims annexed hereto.

We claim:
1. A gas diffusion electrode comprising essentially a sintered porous nickel matrix having up to about 30%, by volume of the electrode mass, of carbon powder of a grain size of less than 60µ sintered into the matrix, said carbon powder carrying a metal catalyst.

2. The gas diffusion electrode of claim 1, wherein the metal catalyst is a noble metal catalyst from the group consisting of palladium and mixtures of palladium and silver.

3. The gas diffusion electrode of claim 1, wherein the metal catalyst is a compound of a metal selected from the group consisting of silver, vanadium, and molybdenum.

4. A fuel cell including at least one gas diffusion electrode comprising essentially a sintered porous nickel matrix having up to about 30%, by volume of the electrode mass, of carbon powder of a grain size of less than 60µ sintered into the matrix, said carbon powder carrying a metal catalyst.

5. A fuel cell including a negative and a positive gas diffusion electrode each comprising essentially a porous powdered nickel matrix having up to about 30%, by volume of the electrode mass, of carbon powder of a grain size of less than 60µ sintered into the matrix, a metal catalyst selected from the group consisting of palladium, mixtures of palladium and silver being carried by the carbon powder in the negative electrode, and a metal compound catalyst selected from the group consisting of a silver, vanadium, and molybdenum compound being carried by the carbon powder in the positive electrode.

6. A method of manufacturing a gas diffusion electrode, comprising the steps of sintering together a mixture of nickel powder and not exceeding 30%, by volume of the electrode mass, of carbon powder of a grain size of less than 60µ and impregnating the sintered matrix with a metallic catalyst.

7. The method of claim 6, wherein the matrix is impregnated with a colloidal metal catalyst.

8. The method of claim 6, wherein the matrix is impregnated with a metal salt solution and the metal is precipitated on said matrix by a treatment with a reducing solution.

9. The method of claim 8, wherein the reducing solution is a hydrazine solution.

10. The method of claim 6, wherein the matrix is impregnated with a metal salt solution and the metal is precipitated on said matrix by a cathodic treatment of said metal salt impregnated matrix.

References Cited by the Examiner

UNITED STATES PATENTS

| | | | |
|---|---|---|---|
| 1,988,861 | 1/1935 | Thorausch et al. | 75—222 |
| 2,384,463 | 9/1945 | Gunn | 136—86 |
| 2,699,458 | 1/1955 | Schlecht | 136—29 X |
| 2,860,175 | 11/1958 | Justi et al. | 136—86 |
| 2,901,523 | 8/1959 | Justi et al. | 136—122 |
| 2,938,064 | 5/1960 | Kordesch | 136—136 |
| 2,945,759 | 7/1960 | Shaw et al. | 75—201 |
| 2,969,413 | 1/1961 | Peters | 136—36 X |
| 3,068,157 | 12/1962 | Vielstich et al. | 136—86 |
| 3,097,974 | 7/1963 | McEvoy et al. | 136—120 |

FOREIGN PATENTS 1,116,287  11/1961  Germany.

JOHN H. MACK, *Primary Examiner.*

JOHN R. SPECK, JOSEPH REBOLD, S. PARKER, J. E. CARSON, W. VAN SISE, *Assistant Examiners.*